United States Patent [19]

Yoshinaga et al.

[11] Patent Number: 4,989,943
[45] Date of Patent: Feb. 5, 1991

[54] OPTICAL FIBER ALIGNMENT DEVICE
[75] Inventors: Akitoshi Yoshinaga; Mitsuru Sugawara, both of Kanagawa, Japan
[73] Assignee: Kabushiki Kaisha Toshiba, Kawasaki, Japan
[21] Appl. No.: 409,585
[22] Filed: Sep. 18, 1989
[30] Foreign Application Priority Data Nov. 2, 1988 [JP] Japan .................. 63-277817

[51] Int. Cl.5 .............. G02B 6/32; G02B 6/26; H01J 5/16
[52] U.S. Cl. .............. 350/96.18; 350/96.20; 250/227.11
[58] Field of Search ............ 350/96.15, 96.16, 96.17, 350/96.18, 96.20, 96.21, 96.22, 416; 250/227.11

[56] References Cited
U.S. PATENT DOCUMENTS

| 3,950,075 | 4/1976 | Cook et al. | 350/96.18 X |
| 4,186,995 | 2/1980 | Schumacher | 350/96.18 |
| 4,632,505 | 12/1986 | Allsworth | 350/96.21 |
| 4,824,202 | 4/1989 | Auras | 350/96.18 |
| 4,889,399 | 12/1989 | Mariani et al. | 350/96.20 |
| 4,889,406 | 12/1989 | Sezerman | 350/96.21 |
| 4,911,523 | 3/1990 | Sondergeld et al. | 350/96.21 |
| 4,919,506 | 4/1990 | Covey | 350/96.18 |

FOREIGN PATENT DOCUMENTS

| 62-293210 | 12/1987 | Japan | 350/96.18 X |
| 63-149611 | 6/1988 | Japan | 350/96.18 X |
| 2148536 | 5/1985 | United Kingdom | 350/96.18 X |

Primary Examiner—Brian Healy
Attorney, Agent, or Firm—Cushman, Darby & Cushman

[57] ABSTRACT

An optical circuit device includes an optical fiber element, a lens and several holders. An inner holder which is elastic, holds the optical fiber element and a lens on the same optical axis. An intermediate holder fixes the inner holder therein. An outer holder, which is connected to an optical signal receiving device, holds the intermediate holder therein. An optical axis of the inner holder is adjusted by shifting the position of the intermediate holder in the outer holder parallel to the optical axis. Also, the optical axis is adjusted by moving the outer holder perpendicular to the optical axis.

16 Claims, 3 Drawing Sheets

OPTICAL FIBER ALIGNMENT DEVICE

BACKGROUND OF THE INVENTION

1. Field of the Invention

This invention relates to a device used for optical communications. More specifically, the invention relates to an optical fiber assembly for holding an optical fiber and a lens.

2. Description of Related Art

Optical communication systems, using optical fibers, have been applied to a wide variety of fields. Optical circuit components, used in such optical communication systems, have been compact and inexpensive to produce. One example of an optical circuit device is an optical fiber lens assembly which holds an optical fiber and a lens. Such an optical fiber lens assembly may be used with a compact optical coupler or a compact optical multiplexer/demultiplexer, for example. In fact the optical fiber lens assembly may even incorporate another optical component, such as an optical filter. In the optical fiber lens assembly, the optical fiber and a lens are separated by an accurate distant in a sleeve and are fixed to the sleeve by an adhesive. When adhesive is used which hardens at a normal temperature, the parts must be held by a tool for a long time until the adhesive hardens. When adhesive is used which hardens at a high temperature, a specialized tool must be used which is not affected by high temperatures. Deflections of the optical axis from optimal easily occur during hardening of the adhesive. Therefore, it is difficult to produce an optical circuit device which has a stabilized and uniform quality.

SUMMARY OF THE INVENTION

It is an object of the present invention to improve the ease of producing an optical circuit device.

It is a further object of the present invention to provide an optical circuit device in which dimensions are stabilized and repeatable.

It is still a further object of the present invention to prevent a deflection of the optical axis from a predetermined axis.

To achieve the above objects and in accordance with the purpose of the invention, as embodied and broadly described herein, the invention provides an optical circuit device. An optical fiber and a lens are fixed to an inner holder which is elastic. An intermediate holder which holds the inner holder may be fixed to an outer holder. An optical axis of the optical circuit device is adjusted by shifting the position of the intermediate holder parallel the optical axis in the outer holder and by moving the outer holder perpendicular to the optical axis.

BRIEF DESCRIPTION OF THE DRAWINGS

The present invention is best understood with reference to accompanying drawings in which:

FIG. 3 (b) is a sectional view of an inner sleeve in a device shown in FIG. 1 with stress;

DETAILED DESCRIPTION OF THE PREFERRED EMBODIMENTS

Figure 1:
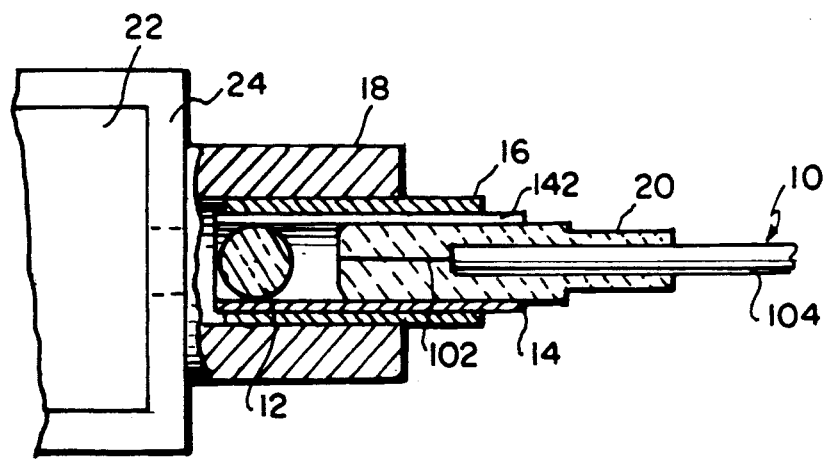
FIG. 1 is a longitudinal sectional view of an optical circuit device according to one embodiment of this invention.

Referring to the accompanying drawings, various embodiments of the present invention will be described. However, in the drawings, the same numerals are applied to similar elements in the drawings, and therefore detailed descriptions thereof are not repeated.

As shown in FIG. 1, an optical circuit device includes an optical fiber 10, a lens 12, an inner sleeve 14, an intermediate sleeve 16 and an outer sleeve 18. The optical fiber 10 has an optical fiber strand 102 and a jacket (covering layer) 104 which covers the strand 102. A ferrule 20, which is made of, for example, ceramic or metal, holds strand 102 and jacket 104 together therein.

Figure 2:
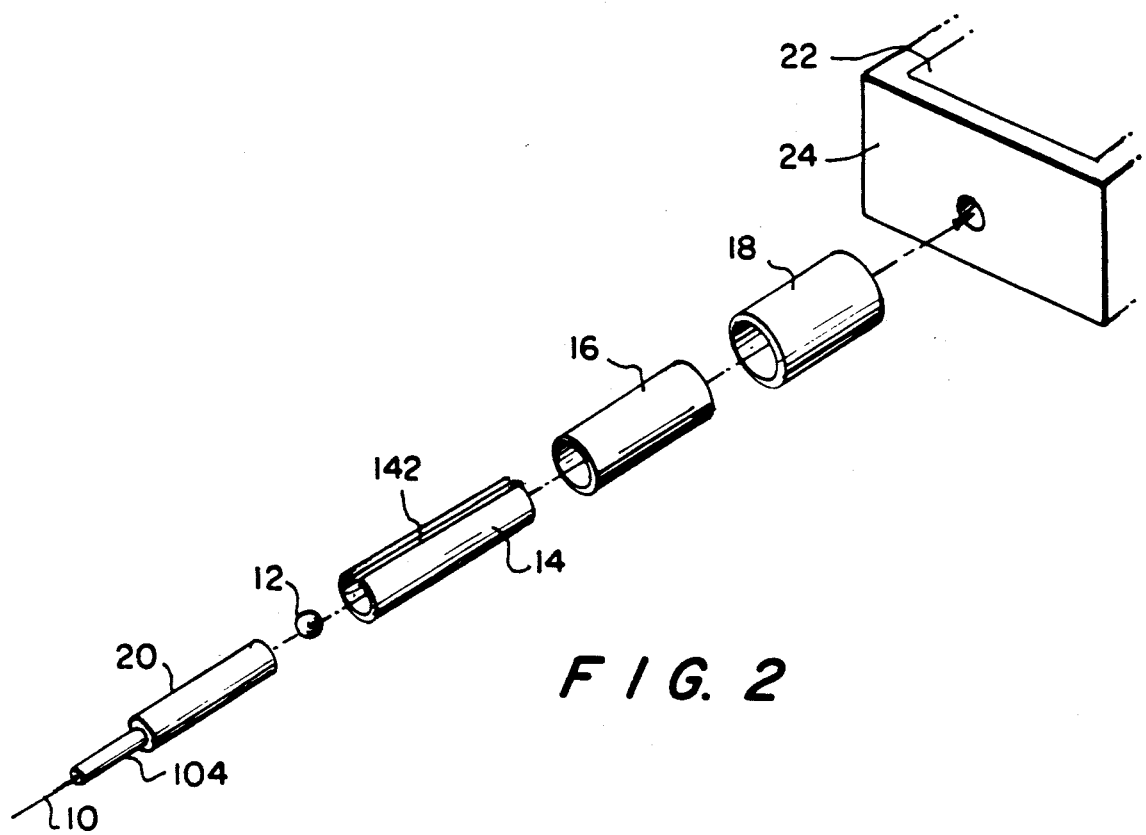
FIG. 2 is an exploded perspective view of the optical circuit device shown in FIG. 1.
Figure 3A:
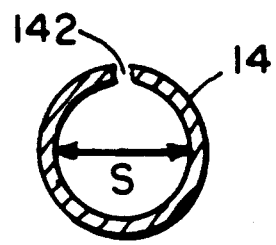
FIG. 3 (a) is a sectional view of an inner sleeve in a device shown in FIG. 1 without stress.
Figure 3B:
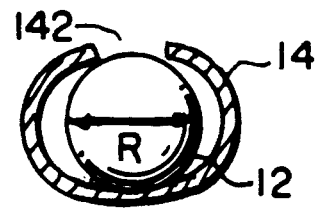

Optical fiber 10 introduces optical signals and lens 12, which is a spherical lens, focuses optical signals from fiber 10. Inner sleeve 14 is elastic and flexible because it is split. The optical fiber 10 and the lens 12 are fixed to the inner sleeve 14 on the same optical axis. Intermediate sleeve 16 holds inner sleeve 14 therein. Outer sleeve 18 holds intermediate sleeve 16 therein and is fixed to an optical signal receiving device 22. FIG. 2 shows an exploded perspective view of the device in FIG. 1. Inner sleeve 14 has a split 142 in a direction parallel to an optical axis 26. Moreover, as shown in FIG. 3(a) and 3(b), inner sleeve 14 is formed so that the inner diameter of sleeve 14, without stress, is a little less than the outer diameter R of lens 12 and ferrule 20.

Thus, inner sleeve 14 has elastic characteristics and the elastic force of sleeve 14 is employed to fix the relative position of lens 12 and ferrule 20 in sleeve 14. The relative position of lens 12 and ferrule 20 cannot be changed unless a great external force is applied to sleeve 14. Therefore, when an optical device is assembled using an adhesive which hardens at a high temperature, the optical device may be assembled in a short time, without a specialized tool, and with dimensions that are stable and repeatable. Also, it is not necessary to adjust the position of intermediate sleeve 16 with respect to outer sleeve 18 with high accuracy. Thus, intermediate sleeve 16 may be fixed to outer sleeve 18 in a short time by an adhesive, which hardens at a high temperature, without a specialized tool.

The adjustment of the optical axis of the optical circuit device parallel to the optical axis, is accomplished by shifting the position of intermediate sleeve 16 in outer sleeve 18. The adjustment in a direction perpendicular to the optical axis is accomplished by moving outer sleeve 18 along a side 24 of optical signal receiving device 22. The optical axis is adjusted, for example, so that the strongest possible optical signal can be received by a receiving element (not shown) in receiving device 22. Then, outer sleeve 18 is fixed to side 24 of receiving device 22.

In fixing the components of the optical device, adhesives are used between fiber 10 and ferrule 20, between lens 12 and inner sleeve 14, between ferrule 20 and inner sleeve 14 and between inner sleeve 14 and intermediate sleeve 16. A YAG laser is used for welding outer sleeve 18 to intermediate sleeve 16 and side 24 of receiving device 22. Moreover, inner sleeve 14 may be welded to outer sleeve 18 by YAG laser directly. However, inner sleeve 14, which is elastic, is generally thin. Therefore, it may be difficult to form an optical fiber with a high accuracy due to the possible deformation of the assembly during welding. Inner sleeve 14 may be formed of phosphor bronze, having an elastic force even without a split.

In the present device, the outer diameter of lens 12 need not be the same as the outer diameter of ferrule 20 due to the elastic force of inner sleeve 14. This improves the ease of producing the optical circuit device.

Figure 4:
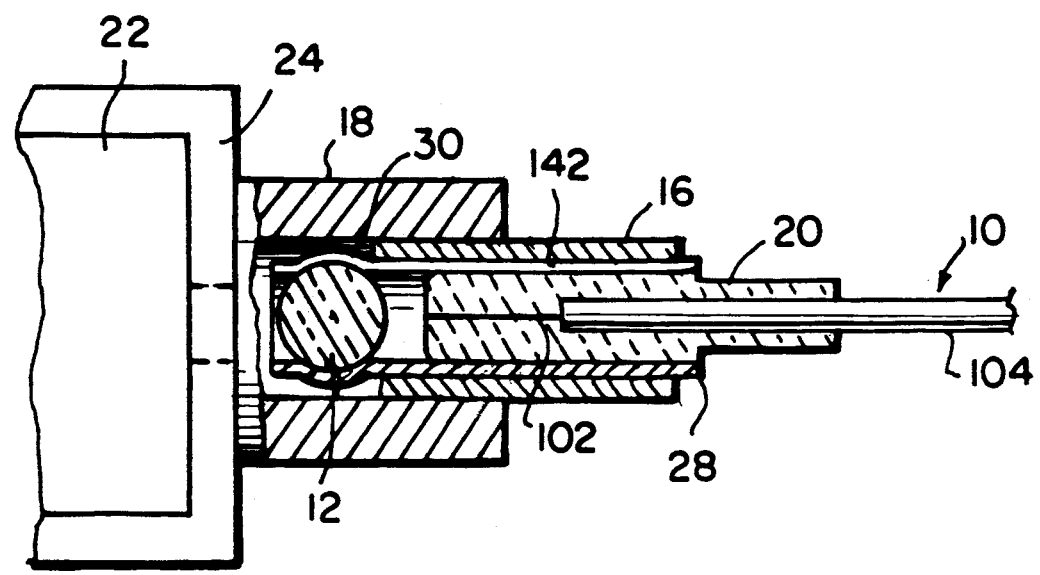
FIG. 4 is a longitudinal sectional view of an optical circuit device according to another embodiment of this invention.

When the outer diameter of lens 12 is different from that of ferrule 20, an inner sleeve 28, shown in FIG. 4, may be employed. Sleeve 28 has a protrusion 30 corresponding to an outer shape of lens 12 to hold lens 12. This allows sleeve 28 to hold lens 12 and ferrule 20 on the same optical axis. The optical axis of the device can be adjusted in the same way as the device shown in FIG. 1.

Figure 5:
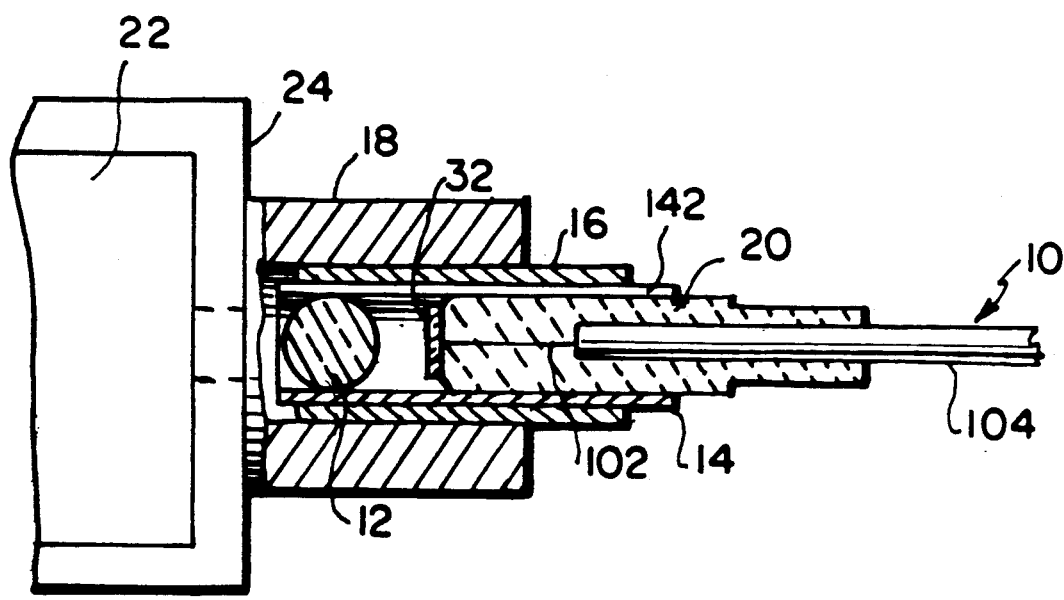
FIG. 5 is a longitudinal sectional view of an optical device according to a further embodiment of this invention.

FIG. 5 shows an optical circuit device which has improved optical characteristics. The device shown in FIG. 5 includes a glass plate 32 with an antireflection film. This film is formed on a surface of glass plate 32 which is fixed to an end of optical fiber strand 102. With the antireflection film, it is possible to suppress retroreflected optical waves at the end of fiber strand 102 and to prevent deterioration in the optical coupling efficiency between optical fiber 10 and an optical receiving element in device 22. This film may be formed on the end of fiber strand 102 directly by vacuum evaporation, etc., to simplify the construction of the optical fiber lens assembly. Also, the antireflection film may be formed on a surface of lens 12 to suppress retroreflected optical waves and prevent the deterioration of the optical coupling efficiency even more.

Figure 6:
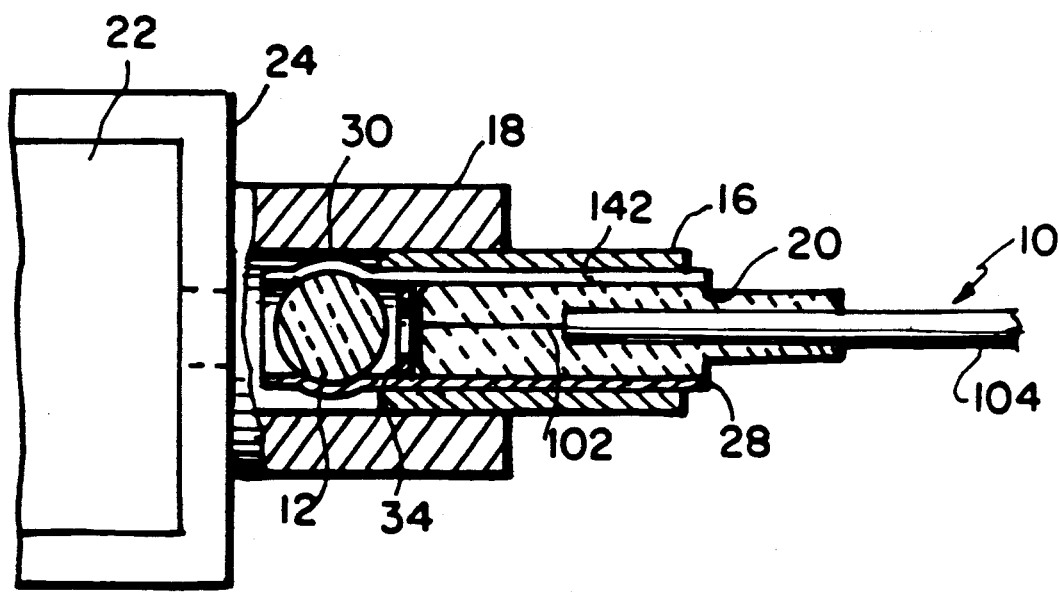
FIG. 6 is a longitudinal sectional view of an optical device according to still a further embodiment of this invention.

As shown in FIG. 6, if a ring 34 is inserted at a predetermined position in inner sleeve 28, it may be useful for arranging lens 12 and ferrule 20 in inner sleeve 28, since ring 34 may prevent ferrule 20 from hitting lens 12.

According to the present invention, it is possible to form an optical fiber lens assembly without any specialized tools and provide an optical circuit device which has stabilized dimensions. Therefore, it is possible with the present invention to provide an improved optical circuit device that is suitable for optical communications systems.

What is claimed is:

1. An optical circuit device comprising:
   optical fiber means for introducing optical signals;
   lens means for focusing the optical signals from the fiber means;
   inner elastic holding means for employing the elasticity of the inner holding means to hold the fiber means and the lens means on the same optical axis; and
   second holding means adapted to be connected to another device, for holding the inner holding means therein, the optical axis of the inner holding means being adjusted by shifting a position of the inner holding means in the second holding means parallel to the optical axis and by moving the second holding means perpendicular to the optical axis.

2. The device of claim 1, wherein the lens means includes a spherical lens.

3. The device of claim 1, wherein the second holding means includes:
   intermediate holding means for fixing the inner holding means therein; and
   outer holding means, adapted to be connected to another device, for holding the intermediate holding means therein, the optical axis of the inner holding means being adjusted by shifting a position of the intermediate holding means in the outer holding means parallel to the optical axis and by moving the outer holding means perpendicular to the optical axis.

4. The device of claim 1, wherein the inner holding means has a split.

5. The device of claim 1, wherein the split is formed in a direction parallel to the optical axis.

6. The device of claim 1, wherein the optical fiber means includes:
   an optical fiber; and
   ferrule means for holding the optical fiber.

7. The device of claim 6, wherein the inner holding means has an inner diameter, without stress, which is less than the outer diameters of the lens means and the ferrule means.

8. The device of claim 3, wherein the intermediate holding means and the outer holding means are positioned to locate the optical axis so that the optical signals can be received with a maximum value.

9. The device of claim 1, wherein the inner holding means is made of phosphor bronze.

10. The device of claim 6, wherein the lens means has an outer diameter which is different from that of the ferrule means.

11. The device of claim 10, wherein the inner holding means has a protrusion corresponding to an outer shape of the lens means.

12. The device of claim 1, further comprising antireflection means, disposed along the optical axis, for preventing the optical signals from being reflected at a defined position.

13. The device of claim 12, wherein the antireflection means includes a glass plate which is fixed to an end of the optical fiber means and an antireflection film formed on a surface of the glass plate.

14. The device of claim 12, wherein the antireflection means includes an antireflection film formed at an end of the optical fiber means.

15. The device of claim 1, further comprising means for preventing the optical fiber means from hitting the lens means.

16. The device of claim 15, wherein the preventing means includes a ring which is arranged between the optical fiber means and the lens means in the inner holding means.

* * * * *